(12) United States Patent
Jalaldeen et al.

(10) Patent No.: US 11,093,890 B2
(45) Date of Patent: *Aug. 17, 2021

(54) DELIVERY LOCATION DETERMINATION

(71) Applicant: INTERNATIONAL BUSINESS MACHINES CORPORATION, Armonk, NY (US)

(72) Inventors: Ahamed Jalaldeen, Bangalore (IN); Chivukula Venkata L. Narayana, Rogers, AR (US)

(73) Assignee: International Business Machines Corporation, Armonk, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 16/574,575

(22) Filed: Sep. 18, 2019

(65) Prior Publication Data

US 2020/0013009 A1   Jan. 9, 2020

Related U.S. Application Data

(63) Continuation of application No. 15/806,505, filed on Nov. 8, 2017, now Pat. No. 10,607,177, which is a
(Continued)

(51) Int. Cl.
*B64C 39/00* (2006.01)
*B64C 39/02* (2006.01)
(Continued)

(52) U.S. Cl.
CPC ....... *G06Q 10/0832* (2013.01); *B64C 39/024* (2013.01); *G01C 21/3605* (2013.01);
(Continued)

(58) Field of Classification Search
CPC .... G06Q 10/0832; G06Q 50/28; G08G 5/025; G08G 5/0069; G08G 5/0026;
(Continued)

(56) References Cited

U.S. PATENT DOCUMENTS 8,554,694 B1 * 10/2013 Ward ................. G06Q 30/0635
                                                        705/330
9,359,074 B2 * 6/2016 Ganesh ................ G05D 1/0022
(Continued)

OTHER PUBLICATIONS

Friedman, Mark J.; List of IBM Patents or Patent Applications Treated as Related; 1 page.
(Continued)

*Primary Examiner* — Yonel Beaulieu
(74) *Attorney, Agent, or Firm* — Schmeiser, Olsen & Watts; Nicholas L. Cadmus

(57) ABSTRACT

A method and system for determining a delivery location is provided. The method includes enabling a UAV delivery application specifying a delivery location for delivery of a package. A street address defining the delivery location is received and an eyewear based video device is enabled and directed towards a geographical area associated with the delivery of the package. GPS data associated with the geographical area is retrieved from the eyewear based video device and first GPS coordinates identifying a location of an embedded computing device are retrieved from a GPS system. A distance between the first GPS coordinates and the geographical area is calculated. Additionally, second GPS coordinates identifying the geographical area are calculated based on the GPS data, the distance, and the first GPS coordinates and it is determined if the second GPS coordinates are located within a specified perimeter surrounding the street address defining the delivery location.

20 Claims, 4 Drawing Sheets

Related U.S. Application Data continuation of application No. 15/199,005, filed on Jun. 30, 2016, now Pat. No. 9,904,901.

(51) Int. Cl.

| | |
|---|---|
| *G06Q 10/08* | (2012.01) |
| *G01C 21/00* | (2006.01) |
| *G08G 5/00* | (2006.01) |
| *G08G 5/02* | (2006.01) |
| *G01C 21/36* | (2006.01) |

(52) U.S. Cl.
CPC ......... *G08G 5/0026* (2013.01); *G08G 5/0034* (2013.01); *G08G 5/0069* (2013.01); *G08G 5/025* (2013.01); *B64C 2201/128* (2013.01); *B64C 2201/146* (2013.01)

(58) Field of Classification Search
CPC .......... G08G 5/0034; G08G 5/00; G08G 1/16; G01C 21/3605; B64C 39/024; B64C 2201/128; B64C 2201/146; B64C 2201/145; B64C 2201/00; B64C 2201/20; G05D 1/00; B64D 1/12
See application file for complete search history.

(56) References Cited

U.S. PATENT DOCUMENTS

| | | | |
|---|---|---|---|
| 9,904,901 | B2 | 2/2018 | Jalaldeen |
| 10,370,103 | B2 * | 8/2019 | Hoareau ............ G06Q 10/0833 |
| 10,607,177 | B2 * | 3/2020 | Jalaldeen .............. B64C 39/024 |
| 2006/0217877 | A1 * | 9/2006 | Bodin .................. G05D 1/0202 701/23 |
| 2012/0316931 | A1 | 12/2012 | Conlan |
| 2013/0297527 | A1 | 11/2013 | Luo |
| 2014/0032034 | A1 * | 1/2014 | Raptopoulos ........ G05D 1/0088 701/25 |
| 2014/0254896 | A1 | 9/2014 | Zhou |
| 2016/0035056 | A1 | 2/2016 | Hyde |
| 2016/0068264 | A1 * | 3/2016 | Ganesh ................. B64C 39/024 701/2 |
| 2017/0011333 | A1 * | 1/2017 | Greiner ............... G06Q 10/083 |
| 2017/0011340 | A1 * | 1/2017 | Gabbai ............ G06Q 10/08355 |
| 2017/0091710 | A1 * | 3/2017 | Van Dyke ............... H04L 67/42 |
| 2018/0005180 | A1 | 1/2018 | Jalaldeen |
| 2018/0068265 | A1 | 3/2018 | Jalaldeen |
| 2018/0095464 | A1 * | 4/2018 | Takayama ............ G05D 1/0088 |

OTHER PUBLICATIONS

Hansen, John Paulin et al.; The Use of Gaze to Control Drones; Proceedings of the ACM Symposium on Eye Tracking Research and Applications—ETRA 2014; Mar. 26-28, 2014; pp. 27-34.

\* cited by examiner

DELIVERY LOCATION DETERMINATION

CROSS REFERENCE TO RELATED APPLICATIONS

This application is a continuation application claiming priority to Ser. No. 15/806,505 filed Nov. 8, 2017, now U.S. Pat. No. 10,607,177 issued Mar. 31, 2020, which is a continuation application claiming priority to Ser. No. 15/199,005 filed Jun. 30, 2016, U.S. Pat. No. 9,904,901 issued Feb. 27, 2018, the contents of which are hereby incorporated by reference.

FIELD

The present invention relates generally to a method for determining a location for delivery and in particular to a method and associated system for determining a specified perimeter associated with an aerial vehicle with respect to the location for delivery.

BACKGROUND

Determining an area for delivery of products typically includes an inaccurate process with little flexibility. Resolving accuracy issues with respect to the delivery area may include a complicated process that may be time consuming and require a large amount of resources. A delivery method may not take into account all related factors and therefore is unable to execute appropriate delivery actions. Accordingly, there exists a need in the art to overcome at least some of the deficiencies and limitations described herein above.

SUMMARY

A first aspect of the invention provides a delivery location determination method comprising: enabling, by a computer processor of an embedded computing device in response to a command from a user, an unmanned aerial vehicle (UAV) delivery software application associated with specifying a delivery location for delivery of at least one package; receiving, by said computer processor from said user, a street address defining said delivery location; enabling, by said computer processor, an eyewear based video device of said embedded computing device; directing, by said computer processor, said eyewear based video device towards a specified geographical area associated with said delivery of said at least one package; retrieving, by said computer processor from said eyewear based video device, GPS data associated with said specified geographical area; retrieving, by said computer processor from a GPS system, first GPS coordinates identifying a location of said embedded computing device; calculating, by said computer processor, a distance between said first GPS coordinates and said specified geographical area; calculating, by said computer processor based on said GPS data, said distance, and said first GPS coordinates, second GPS coordinates identifying said specified geographical area; and first determining, by said computer processor, if said second GPS coordinates are located within a specified perimeter surrounding said street address defining said delivery location.

A second aspect of the invention provides delivery method comprising: receiving, by a computer processor of an embedded computing device comprising an eyewear based video device, a street address for delivery of at least one package to a user; determining, by said computer processor, that said street address comprises an apartment complex comprising a plurality of residences; retrieving, by said computer processor from a data store associated with said user and said apartment complex in response to results of said determining, data describing said user and a specified geographical area located within a specified perimeter surrounding said street address; and enabling, by said computer processor, a flight plan for a UAV for delivering said at least one package to said specified geographical area.

A third aspect of the invention provides a computer program product, comprising a computer readable hardware storage device storing a computer readable program code, said computer readable program code comprising an algorithm that when executed by a computer processor of an embedded computing device implements a delivery location determination method, said method comprising: enabling, by said computer processor in response to a command from a user, an unmanned aerial vehicle (UAV) delivery software application associated with specifying a delivery location for delivery of at least one package; receiving, by said computer processor from said user, a street address defining said delivery location; enabling, by said computer processor, an eyewear based video device of said embedded computing device; directing, by said computer processor, said eyewear based video device towards a specified geographical area associated with said delivery of said at least one package; retrieving, by said computer processor from said eyewear based video device, GPS data associated with said specified geographical area; retrieving, by said computer processor from a GPS system, first GPS coordinates identifying a location of said embedded computing device; calculating, by said computer processor, a distance between said first GPS coordinates and said specified geographical area; calculating, by said computer processor based on said GPS data, said distance, and said first GPS coordinates, second GPS coordinates identifying said specified geographical area; and first determining, by said computer processor, if said second GPS coordinates are located within a specified perimeter surrounding said street address defining said delivery location.

The present invention advantageously provides a simple method and associated system capable of determining an area for delivery.

DETAILED DESCRIPTION

Figure 1:
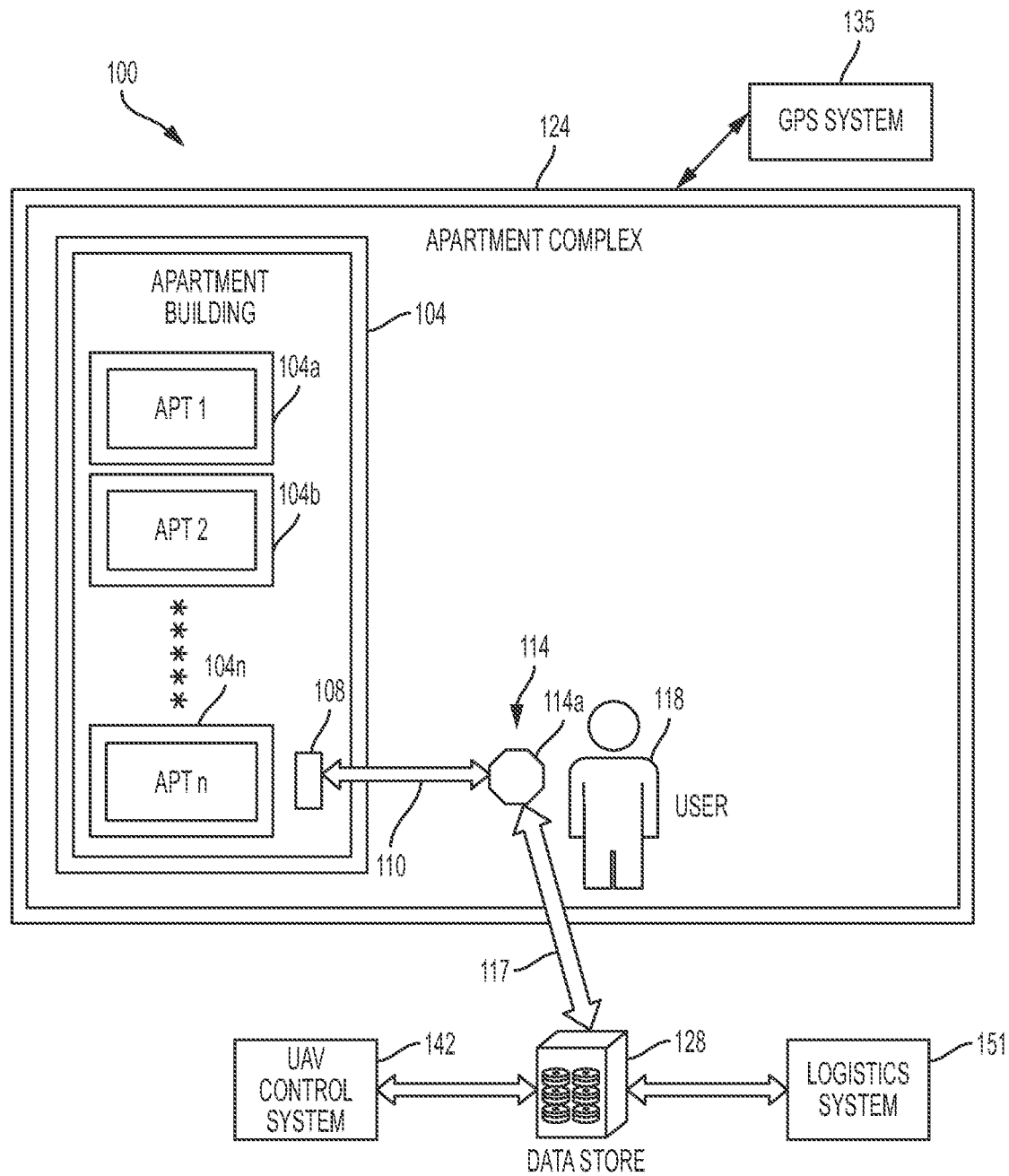
FIG. 1 illustrates a system for determining a location for at least one package delivery, in accordance with embodiments of the present invention.

FIG. 1 illustrates a system 100 for determining a location for package delivery, in accordance with embodiments of the present invention. System 100 enables a process for determining a specific location for an unmanned aerial vehicle (UAV) delivery of consignments to apartments (or any type of structures) by leveraging customer-defined delivery locations. System 100 enables the following features:

1. Utilization of an eyewear based video device (e.g., a eyewear gadget/glasses comprising an integrated display, camera, and GPS) to specify/modify an UAV based consignment delivery location for a specified location (e.g., a specific apartment in an apartment building/complex) with respect to delivering consignments.

2. Validating customer-defined drone delivery locations with respect to apartment building/complex boundaries and identifying duplicates/overlap with another user's UAV delivery location.

System 100 of FIG. 1 includes a GPS system 135, a (external) data store 128, an online retailer logistics system 151 and a UAV control system 142 connected through a network to an embedded computer 114 comprising an eyewear based video device 114a comprising a GPS receiver. Embedded computer 114 retrieves GPS coordinates based data (from GPS system 135) in response to a user 118 (wearing embedded computer 114 comprising eyewear based video device 114a) directing eyewear based video device 114a (in a direction 110) towards a specified area 108 at an apartment building 104 (comprising specified apartments 104a . . . 104n). The GPS coordinates based data (from GPS system 135) and delivery based data are analyzed (by embedded computer 114) to determine exact coordinates for enabling a UAV to accurately deliver a package specified area 108 based on a selection enabled by the user's 118 view. The coordinates are transmitted to a UAV control system for generating instruction for control of a UAV for delivery of packages. An embedded computer is defined herein as a remotely portable dedicated computer comprising a combination of computer hardware and software (fixed in capability or programmable) specifically designed for executing a specialized function. Programmable embedded computers may comprise specialized programming interfaces. An eyewear based video device 114a is defined herein as a wearable technology comprising an optical head-mounted display (OHMD) for displaying information in a smartphone type hands free format. A UAV is defined herein as an aircraft comprising no pilot on board. A UAVs may comprise a remote controlled aircraft (e.g., a drone flown by a pilot at a ground control station) an autonomously controlled aircraft based on pre-programmed flight plans or more complex dynamic automation systems.

System 100 enables user 118 (e.g., a customer) to define and/or modify delivery (via usage of eyewear based video device 114a) locations for last mile (i.e., a very specific location such as a customer location) deliveries via UAVs. Additionally, the location for delivery may be validated based on user selection. The validation process may be performed with respect to apartment building/apartment complex (e.g., apartment building 104) boundaries. Likewise, the validation process may determine if the determined delivery location comprises a duplicate and/or overlapping location with respect to another user's UAV delivery location. Additionally, the validation process may enable enforcement of legal regulations, security regulation, and privacy regulations.

Data store 128 maintains records describing customer specific UAV delivery locations. The following chart illustrates an example comprising a table for maintaining the records in data store 128.

| # | Name | Street # | Street Name | State | Zip code | Apt # | Delivery Location Coordinates |
|---|------|----------|-------------|-------|----------|-------|-------------------------------|
| 1 | Fred | 45 | Main St | NY | 12110 | 4 | 42.81, −23.87 |
| 2 | Sally | 22 | Central Ave | MA | 13098 | 18 | 23.65, 56.98 |
| 3 | Mike | 8 | Airport drive | CA | 12154 | 12 | 65.32, −12.61 |

Figure 2:
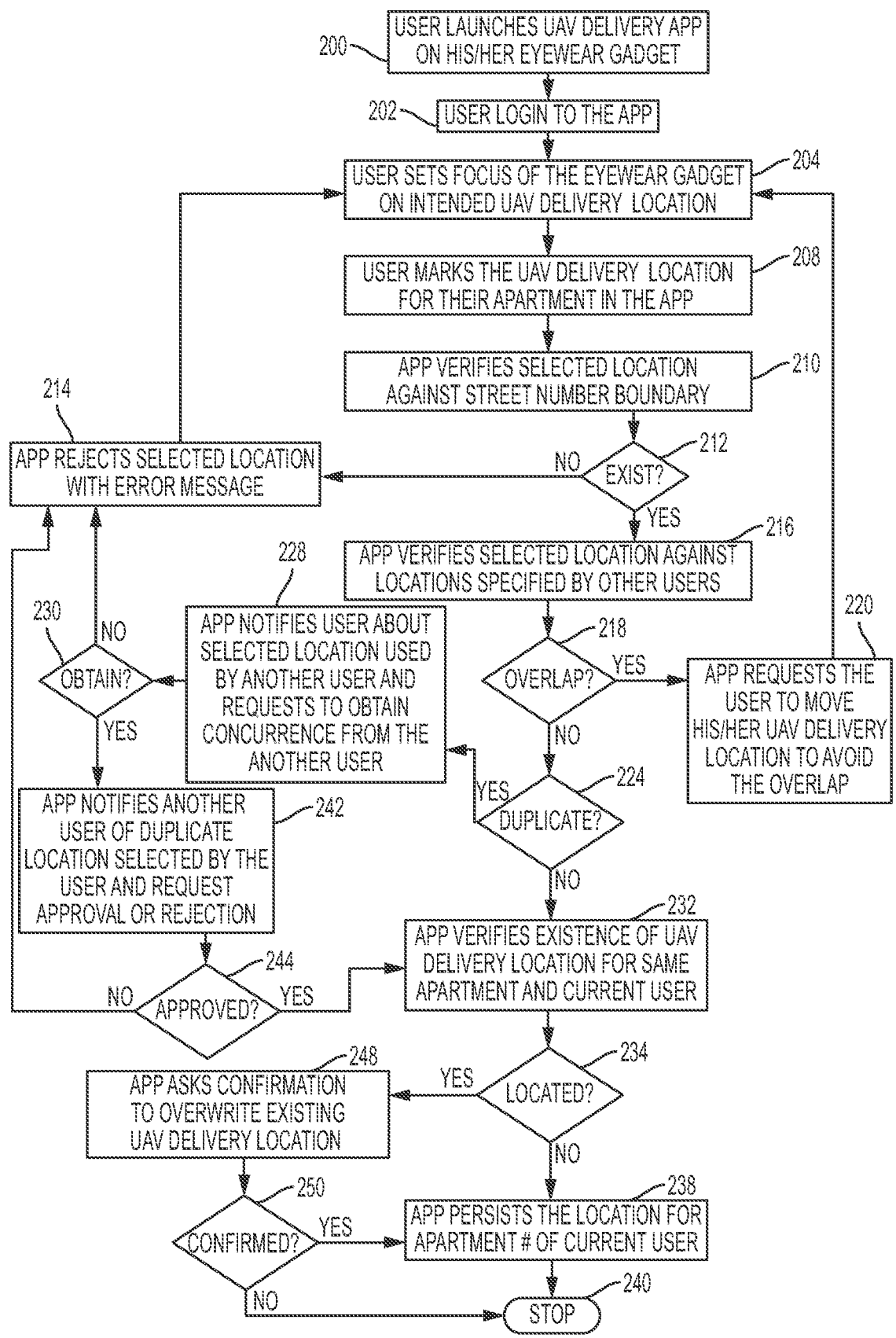
FIG. 2 illustrates an algorithm detailing a process flow enabled by the system of FIG. 1 for determining a specified location for package delivery, in accordance with embodiments of the present invention.

FIG. 2 illustrates an algorithm detailing a process flow enabled by system 100 of FIG. 1 for determining a specified location for package delivery, in accordance with embodiments of the present invention. Each of the steps in the algorithm of FIG. 2 may be enabled and executed in any order by a computer processor(s) executing computer code. In step 200, a user launches a UAV delivery application on his/her eyewear based video device via a menu option or voice command. In step 202, the user enables a login process with respect to the application. If the user has previously completed a registration process, he/she may enter credentials to login to the UAV delivery application. Alternatively, the application enables a registration process and then enables a login process with respect to the application. In step 204, the user directs the eyewear based video device on an intended UAV delivery location with respect to his/her apartment. The eyewear based video device illustrates an area comprising a predefined size necessary for UAV based deliveries. In step 208, the user selects the UAV delivery location in the UAV delivery application via a menu option or voice command. In response, the UAV delivery application calculates a distance from its current GPS coordinates and dynamically computes GPS coordinates of the UAV delivery location selected by the user. In step 210, the UAV delivery application verifies the selected location with respect to an inputted street number (i.e., address) boundary to ensure the selected location exists within a specified perimeter comprising the apartment building or complex. The verification process enables the package to be delivered to a correct address within the apartment building or complex. Additionally, the verification process prevents fraudulent attempts to retrieve packages belonging to users in a differing location. In step 212, it is determined if the selected UAV delivery location exists within a street number boundary of the apartment building or complex. If in step 212, it is determined that the selected UAV delivery location does not exist within a street number boundary of the apartment building or complex then in step 214, the UAV delivery application rejects the selected location and generates/transmits an error message via a voice notification and/or via a display and step 204 is repeated. The error message comprises a reason for rejection (e.g., selected location does not exist within the specified perimeter). Additionally, a request for selection of another UAV delivery location is generated. If in step 212, it is determined that the selected UAV delivery location does exist within a street number boundary of the apartment building or complex then in step 216, the UAV delivery application verifies the selected location against additional UABV delivery locations specified by other users. The verification process of step 216 includes:

1. Determining if the selected location comprises a duplicate location with respect to another user.
2. Determining if the selected location overlaps with a UAV delivery location associated with another user.
3. Determining if the selected location is very close to a UAV delivery location of another user.

The verification process of step 216 ensures unique UAV delivery location usage and an availability of sufficient space for UAV based deliveries. In step 218, it is determined (based on results of step 216) if the selected UAV delivery location overlaps with a UAV delivery location of another user. If in step 218, it is determined that the selected UAV delivery location overlaps with the UAV delivery location of another user then in step 220, the UAV delivery application generates a request (for the user) requesting that the user selects another UAV delivery location to avoid the overlap. The UAV delivery application may display overlapped area via the eyewear based video device and request that the user selects another UAV delivery location to avoid the overlap. If in step 218, it is determined that the selected UAV delivery location does not overlap with the UAV delivery location of another user then in step 224, the UAV delivery application determines if the selected UAV delivery location comprises a duplicate location with respect to a UAV delivery location of another user.

If in step 224, the UAV delivery application determines that the selected UAV delivery location comprises a duplicate location with respect to a UAV delivery location of another user then in step 230, the UAV delivery application notifies the current user that the UAV delivery location comprises the duplicate location and determines if the current user will generate a request to obtain concurrence from another user for usage of the existing UAV delivery location. If the current user will not generate a request to obtain concurrence then step 214 is repeated. If the current user will generate a request to obtain concurrence then step 242, the UAV delivery application notifies another (existing) user of the UAV delivery location that the current user is requesting usage of the UAV delivery location and requests an approval for usage of the UAV delivery location. If the request is not approved then step 214 is repeated. If the request is approved then step 232 is executed as described, infra.

If in step 224, the UAV delivery application determines that the selected UAV delivery location does not comprise a duplicate location with respect to a UAV delivery location of another user then in step 232, the UAV delivery application verifies the existence of the UAV delivery location for a same apartment and current user in a customer specific UAV delivery location data store. In step 234, it is determined if a UAV delivery location for the same apartment and user in the customer-specific UAV delivery location data store is located. If in step 234, it is determined that a UAV delivery location for the same apartment and user in the customer-specific UAV delivery location data store has been located, then in step 248, the UAV delivery application communicates the existence of a UAV delivery location for a same apartment and requests a confirmation from a current user to overwrite the existing UAV delivery location. If the request is confirmed (in step 250) then 238 is executed as described, infra. If the request is not confirmed (in step 250) then the process is terminated in step 240. If in step 234, it is determined that a UAV delivery location for the same apartment and user in the customer-specific UAV delivery location data store has not been located, then in step 238, the UAV delivery application writes the UAV delivery location for the apartment number entered by the current user by generating a new entry in the customer specific drone delivery location data store and generates a confirmation for the current user and the process is terminated in step 240.

Figure 3:
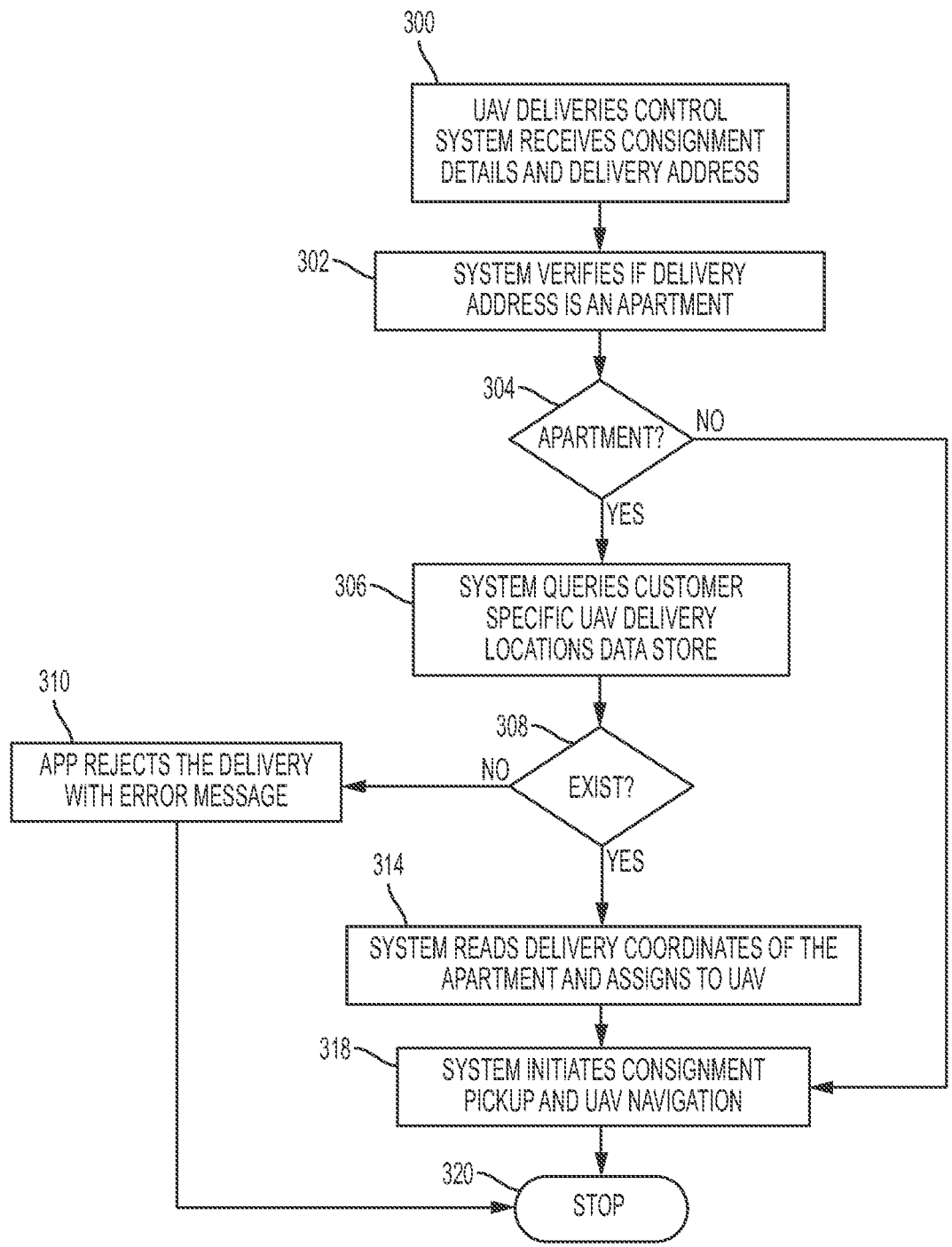
FIG. 3 illustrates an algorithm detailing a process flow enabled by the system of FIG. 1 for delivering packages to a specified location via usage of a UAV in accordance with embodiments of the present invention.

FIG. 3 illustrates an algorithm detailing a process flow enabled by system 100 of FIG. 1 for delivering packages to a specified location via usage of a UAV in accordance with embodiments of the present invention. Each of the steps in the algorithm of FIG. 3 may be enabled and executed in any order by a computer processor(s) executing computer code. In step 300, a UAV control system (e.g., UAV control system 142 of FIG. 1) receives package details and delivery address from a logistics system (e.g., logistics system 151 of FIG. 1). In step 302, the UAV control system verifies if the delivery address comprises an apartment. If (in step 304) the delivery address is determined to not comprise an apartment then step 318 is executed as described, infra. If (in step 304) the delivery address is determined to comprise an apartment then in step 306, the UAV control system queries a customer specific drone delivery location data store. The query uses a customer name and delivery address to determine the existence of a UAV delivery location defined by the customer. If (in step 308), it is determined that a UAV delivery location defined by the customer does not exist then in step 310, the UAV control system logs an absence of an entry in a customer specific delivery location data store (for the associated apartment), the delivery is rejected, and an error message is generated and transmitted to a the logistics system. If (in step 308), it is determined that a UAV delivery location defined by the customer does exist then in step 314, the UAV control system reads delivery coordinates (from the customer specific delivery location data store) and assigns the coordinates to a UAV. In step 318, the UAV control system initiates a package pickup and UAV navigation process. The package pickup and UAV navigation process includes generating instructions for package pickup from a distribution center and navigation of the UAV to the apartment. The process is terminated in step 320.

Figure 4:
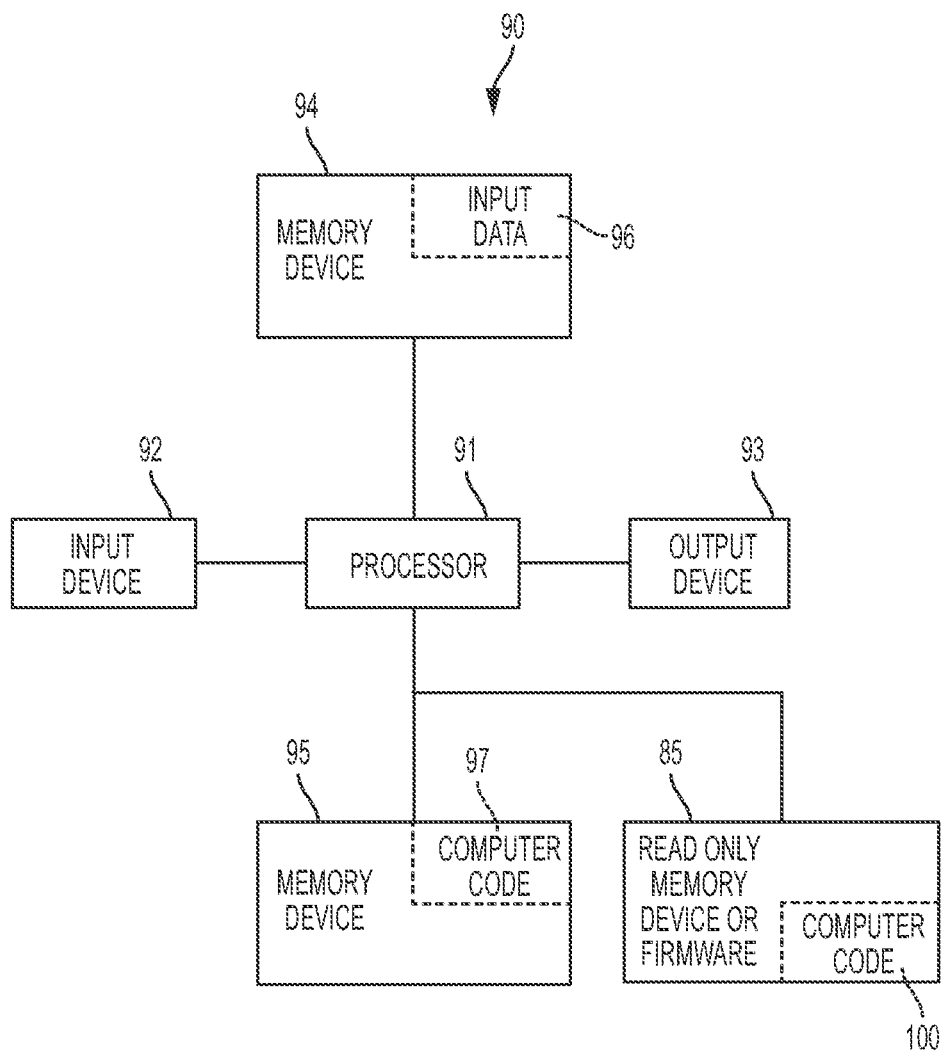
FIG. 4 illustrates a computer system used by the system of FIG. 1 for enabling a process for determining a location for package delivery, in accordance with embodiments of the present invention.

FIG. 4 illustrates a computer system 90 (e.g., UAV control system 142 and/or embedded computer 114) used by or comprised by the system of FIG. 1 for enabling a process for determining a location for package delivery, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 (e.g., UAV control system 142 and/or embedded computer 114) includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for enabling a process for determining a location for package delivery. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2-3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to for determine a location for package delivery. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for determining a location for package delivery. In another embodiment, the invention provides a business method that performs the process steps of the invention on a subscription, advertising, and/or fee basis. That is, a service supplier, such as a Solution Integrator, could offer to enable a process for determining a location for package delivery. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A delivery location determination method comprising:
enabling, by a computer processor of an embedded computing device in response to a command from a user, an unmanned aerial vehicle (UAV) delivery software application associated with specifying a delivery location for delivery of at least one package;
directing, by said computer processor, an eyewear based video device, of said embedded computing device, towards a specified geographical area associated with said delivery of said at least one package;
retrieving, by said computer processor from said eyewear based video device, GPS data associated with said specified geographical area;
retrieving, by said computer processor from a GPS system, first GPS coordinates identifying a location of said embedded computing device;
calculating, by said computer processor, a distance between said first GPS coordinates and said specified geographical area;
calculating, by said computer processor based on said GPS data, said distance, and said first GPS coordinates, second GPS coordinates identifying said specified geographical area; and
first determining, by said computer processor, if said second GPS coordinates are located within a specified perimeter surrounding a street address defining said delivery location.

2. The method of claim 1, wherein results of said first determining indicate that said second GPS coordinates are not located within said specified perimeter, and wherein said method further comprises:
rejecting, by said computer processor, said specified geographical area for said delivery of said at least one package; and
presenting, by said computer processor to said user, a message indicating said rejecting.

3. The method of claim 1, wherein results of said first determining indicate that said second GPS coordinates are located within said specified perimeter, and wherein said method further comprises:
second determining, by said computer processor, if said specified geographical area is associated with a different user.

4. The method of claim 3, wherein results of said second determining indicate that said specified geographical area is associated with said different user, and wherein said method further comprises:
generating, by said computer processor, a request for selecting a new specified geographical area for said delivery of said at least one package; and
transmitting, by said computer processor, said request to said user.

5. The method of claim 3, wherein results of said second determining indicate that said specified geographical area is associated with said different user, and wherein said method further comprises:
generating, by said computer processor, a request for concurrently using said specified geographical area for said delivery of said at least one package; and
transmitting, by said computer processor, said request to said user;
receiving, by said computer processor from said user, approval for concurrently using said specified geographical area for said delivery of said at least one package; and
transmitting, by said computer processor to a UAV, instructions for delivering said at least one package to said specified geographical area.

6. The method of claim 3, wherein results of said second determining indicate that said specified geographical area is not associated with said different user, and wherein said method further comprises:
transmitting, by said computer processor to an aircraft, instructions for delivering said at least one package to said specified geographical area.

7. The method of claim 6, wherein said UAV comprises a drone aircraft.

8. The method of claim 1, wherein results of said first determining indicate that said second GPS coordinates overlap with said specified perimeter, and wherein said method further comprises:
  second determining, by said computer processor, if said specified geographical area is associated with a different user.

9. The method of claim 8, wherein results of said second determining indicate that said specified geographical area is associated with said different user, and wherein said method further comprises:
  generating, by said computer processor for said user, a request for selecting a new specified geographical area for said delivery of said at least one package to avoid said overlap.

10. The method of claim 1, further comprising:
  providing at least one support service for at least one of creating, integrating, hosting, maintaining, and deploying computer-readable code in the computing system, said code being executed by the computer processor to implement: said enabling said UAV software delivery application, said directing, said retrieving said GPS data, said retrieving said first GPS coordinates, said calculating said distance, said calculating said second GPS coordinates, and said first determining.

11. A delivery method comprising:
  receiving, by a computer processor of an embedded computing device comprising an eyewear based video device, a street address for delivery of at least one package to a user;
  retrieving, by said computer processor from a data store associated with said user and an apartment complex comprising a plurality of residences of said street address, data describing said user and a specified geographical area located within a specified perimeter surrounding said street address;
  directing, by said computer processor based on a flight plan for a UAV for delivering said at least one package to said specified geographical area, said eyewear based video device towards said specified geographical area;
  retrieving, by said computer processor from said eyewear based video device, GPS data associated with said specified geographical area;
  retrieving, by said computer processor from a GPS system, first GPS coordinates identifying a location of said embedded computing device;
  calculating, by said computer processor, a distance between said first GPS coordinates and said specified geographical area;
  calculating, by said computer processor based on said GPS data, said distance, and said first GPS coordinates, second GPS coordinates identifying said specified geographical area; and
  first determining, by said computer processor, if said second GPS coordinates are located within said specified perimeter surrounding said street address defining a delivery location for said at least one package.

12. A computer program product, comprising a computer readable hardware storage device storing a computer readable program code, said computer readable program code comprising an algorithm that when executed by a computer processor of an embedded computing device implements a delivery location determination method, said method comprising:
  enabling, by said computer processor in response to a command from a user, an unmanned aerial vehicle (UAV) delivery software application associated with specifying a delivery location for delivery of at least one package;
  directing, by said computer processor, an eyewear based video device, of said embedded computing device, towards a specified geographical area associated with said delivery of said at least one package;
  retrieving, by said computer processor from said eyewear based video device, GPS data associated with said specified geographical area;
  retrieving, by said computer processor from a GPS system, first GPS coordinates identifying a location of said embedded computing device;
  calculating, by said computer processor, a distance between said first GPS coordinates and said specified geographical area;
  calculating, by said computer processor based on said GPS data, said distance, and said first GPS coordinates, second GPS coordinates identifying said specified geographical area; and
  first determining, by said computer processor, if said second GPS coordinates are located within a specified perimeter surrounding a street address defining said delivery location.

13. The computer program product of claim 12, wherein results of said first determining indicate that said second GPS coordinates are not located within said specified perimeter, and wherein said method further comprises:
  rejecting, by said computer processor, said specified geographical area for said delivery of said at least one package; and
  presenting, by said computer processor to said user, a message indicating said rejecting.

14. The computer program product of claim 12, wherein results of said first determining indicate that said second GPS coordinates are located within said specified perimeter, and wherein said method further comprises:
  second determining, by said computer processor, if said specified geographical area is associated with a different user.

15. The computer program product of claim 14, wherein results of said second determining indicate that said specified geographical area is associated with said different user, and wherein said method further comprises:
  generating, by said computer processor, a request for selecting a new specified geographical area for said delivery of said at least one package; and
  transmitting, by said computer processor, said request to said user.

16. The computer program product of claim 14, wherein results of said second determining indicate that said specified geographical area is associated with said different user, and wherein said method further comprises:
  generating, by said computer processor, a request for concurrently using said specified geographical area for said delivery of said at least one package; and
  transmitting, by said computer processor, said request to said user;
  receiving, by said computer processor from said user, approval for concurrently using said specified geographical area for said delivery of said at least one package; and
  transmitting, by said computer processor to a UAV, instructions for delivering said at least one package to said specified geographical area.

17. The computer program product of claim 14, wherein results of said second determining indicate that said specified geographical area is not associated with said different user, and wherein said method further comprises:

transmitting, by said computer processor to an aircraft, instructions for delivering said at least one package to said specified geographical area.

18. The computer program product of claim 17, wherein said UAV comprises a drone aircraft.

19. The computer program product of claim 12, wherein results of said first determining indicate that said second GPS coordinates overlap with said specified perimeter, and wherein said method further comprises:

second determining, by said computer processor, if said specified geographical area is associated with a different user.

20. The computer program product of claim 19, wherein results of said second determining indicate that said specified geographical area is associated with said different user, and wherein said method further comprises:

generating, by said computer processor for said user, a request for selecting a new specified geographical area for said delivery.

* * * * *